United States Patent
Teshima

(10) Patent No.: US 6,901,427 B2
(45) Date of Patent: May 31, 2005

(54) FONT SHARING SYSTEM IN WHICH DATA REPRESENTING A CHARACTER STRING CAN BE COMMUNICATED BETWEEN A CLIENT COMPUTER AND A SERVER WHEREIN ONLY LAYOUT FRAMES ARE DISPLAYED IN A PREVIEW AREA OF A DISPLAY SCREEN

(75) Inventor: Atsushi Teshima, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/281,797

(22) Filed: Mar. 31, 1999

(65) Prior Publication Data

US 2002/0194261 A1 Dec. 19, 2002

(30) Foreign Application Priority Data

Mar. 31, 1998 (JP) .......................................... 10-101774

(51) Int. Cl.[7] .............................................. G06F 15/16
(52) U.S. Cl. ........................ 709/203; 709/217; 709/219
(58) Field of Search ................................ 709/203, 223, 709/217, 219; 435/441, 636

(56) References Cited

U.S. PATENT DOCUMENTS

| | | | | |
|---|---|---|---|---|
| 5,220,674 A | * | 6/1993 | Morgan et al. ............. | 709/223 |
| 5,432,899 A | * | 7/1995 | Iwatani et al. .............. | 707/542 |
| 5,528,742 A | * | 6/1996 | Moore et al. ............... | 707/542 |
| 5,533,174 A | * | 7/1996 | Flowers, Jr. et al. ....... | 358/1.15 |
| 5,574,842 A | * | 11/1996 | Takakura et al. ........... | 715/542 |
| 5,590,247 A | * | 12/1996 | Mikuni ....................... | 358/1.11 |
| 5,761,395 A | | 6/1998 | Miyazaki et al. | |
| 5,781,714 A | * | 7/1998 | Collins et al. .............. | 345/471 |
| 5,864,636 A | * | 1/1999 | Chisaka ...................... | 382/189 |
| 5,892,843 A | * | 4/1999 | Zhou et al. ................. | 382/176 |
| 5,970,225 A | * | 10/1999 | Jackson et al. ............. | 358/1.18 |
| 6,057,858 A | * | 5/2000 | Desrosiers .................. | 345/467 |
| 6,189,020 B1 | * | 2/2001 | Shimizu ...................... | 345/660 |

FOREIGN PATENT DOCUMENTS

| | | |
|---|---|---|
| CN | 1117612 | 2/1996 |
| EP | 0480399 | 4/1992 |
| EP | 0534622 | 3/1993 |
| GB | 2316778 | 3/1998 |

OTHER PUBLICATIONS

Perry, "Teach Yourself WINDOWS 95," 1997.*

* cited by examiner

*Primary Examiner*—Hosain Alam
*Assistant Examiner*—Philip B. Tran
(74) *Attorney, Agent, or Firm*—Birch, Stewart, Kolasch & Birch, LLP

(57) ABSTRACT

A client computer and a server share fonts in an efficient manner. The client computer and server are capable of communicating data with each other. Character specifying data for specifying a character and a font ID for specifying the font of this character are stored in a layout information file and transmitted from the client computer to the server. On the basis of a layout information file, the server retrieves character image data (a bitmap text file) expressing the character as an image. The server transmits the found character image data to the client computer. When character image data cannot be found, the character image data is generated and is then transmitted from the server to the client computer.

8 Claims, 19 Drawing Sheets

*Fig. 10a*            *Fig. 10b*
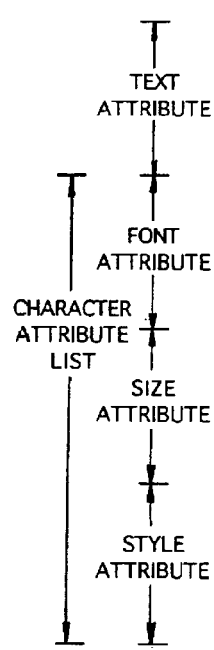
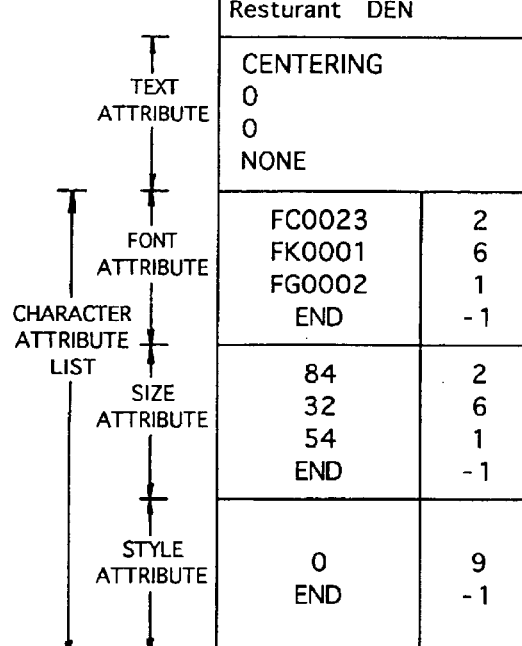

Fig. 11

DEFAULT TEXT ATTRIBUTES

JUSTIFIED LEFT
0
0
NONE

Fig. 12

FONT ID TABLE

| FONT NAME | FONT ID | SAMPLE |
|---|---|---|
| FUJI GOTHIC | FG0001 | ABab1 |
| FUJIMARU GOTHIC | FG0002 | ABab1 |
| ⋮ | ⋮ | ⋮ |
| FUJI COMIC | FC0023 | *ABab1* |
| ⋮ | ⋮ | ⋮ |
| FUJI BLOCK | FK0001 | ABab1 |
| ⋮ | ⋮ | ⋮ |

Fig. 20

Fig. 21

In English, the word "Den" stands for "cellar" or a lair where animals live, but it can also mean a comfortable room in which to relax.

Spend some time relaxing at the Den this evening.

Fig. 22a

0-0-0 Minami Aoyoama, Minato-ku, Tokyo

TEL:03-0XXX-0000
FAX:03-0XXX-XXXX

CREATED AT CHARACTER SIZE A20

Fig. 22b

0-0-0 Minami Aoyama, Minato-ku, Tokyo
TEL:03-0XXX-0000
FAX:03-0XXX-XXXX
BUSINESS HOURS: 11:00 AM - 10:30 PM

CREATED AT CHARACTER SIZE 19

Fig. 22c

0-0-0 Minami Aoyama, Minato-ku, Tokyo
TEL:03-0XXX-0000
FAX:03-0XXX-XXXX
BUSINESS HOURS: 11:00 AM - 10:30 PM
CLOSED ON SECOND AND THIRD WEDNESDAYS

CREATED AT CHARACTER SIZE 18

FONT SHARING SYSTEM IN WHICH DATA
REPRESENTING A CHARACTER STRING
CAN BE COMMUNICATED BETWEEN A
CLIENT COMPUTER AND A SERVER
WHEREIN ONLY LAYOUT FRAMES ARE
DISPLAYED IN A PREVIEW AREA OF A
DISPLAY SCREEN

BACKGROUND OF THE INVENTION

1. Field of the Invention

This invention relates to a system and method in which fonts are shared by a client computer and server capable of performing data communication with each other, a recording medium storing a program for executing a font sharing method, a client computer constructing a system in which fonts are shared, and a method of controlling the operation thereof.

2. Description of the Related Art

In a case where data is communicated between a client computer and a server and text is displayed or printed, three methods of displaying or printing characters having specific fonts are available.

Specifically, the first method includes transmitting data representing a character as well as data such as a name specifying the a character font from the client computer to the server and having the server display and/or print the a character having the font. Alternatively, the method includes transmitting the data representing a character as well as data such as a name specifying the a character font from the server to the client computer and having the client computer display and/or print the a character having the font.

The second method includes transmitting outline information from the client computer to the server and having the server display, for example, a character having an outline in accordance with the outline information, or transmitting outline information from the server to the client computer and having the client computer display, for example, a character having an outline in accordance with outline information.

The third method includes transmitting bitmap image data from the client computer to the server and having the server display, for example, a character based upon the bitmap image data, or transmitting bitmap image data from the server to the client computer and having the client computer display, for example, a character based upon the bitmap image data.

The first method is not appropriate for the current trend toward use of multiple platforms. The second method sends and receives outline information and therefore makes it difficult to protect any copyright that a font might possess. The third method sends and receives bitmap image data and therefore involves difficulty in terms of performing editing using the character. Since a large quantity of data is involved, moreover, communication cost is comparatively high.

There are also systems in which one host computer and a plurality of client computers are connected by a network and outline information for an outline font is transmitted from the host computer to the client computers in response to a transmission request. However, since the outline font depends upon the operating system, font type and character codes, etc., this arrangement is not very suitable for cases where foreign-language text is displayed or printed.

SUMMARY OF THE INVENTION

Accordingly, an object of the present invention is to make it possible for fonts to be shared by a client computer and server in an efficient manner.

A font sharing system according to the present invention is one in which data can be communicated between a client computer and a server. The client computer has means (a transmitting device) for transmitting character specifying data, which specifies a character, and font specifying data, which specifies the font of the character, to the server. The server includes first character image data storage means (a first character image data storage device) storing character image data expressing a character as an image; receiving means (a receiving device) for receiving the character specifying data and the font specifying data transmitted from the client computer; retrieval means (a retrieval device) for retrieving, from the first character image data storage means, character image data expressing a character, which has been specified by the character specifying data received by the receiving means, as an image in such a manner that the specified character will have a font specified by the font specifying data received by the receiving means; character image data generating means (a character image data generating device) for generating the character image data in response to a situation where the character image data cannot be found in the first character image data storage means by retrieval performed by the retrieval means; and character image data transmitting means (a character image data transmitting device) for transmitting, to the client computer, character image data generated in the character image data generating means or character image data found by retrieval by the retrieval means.

The present invention provides also a method suited to the above-described system. Specifically, the present invention provides a font sharing method in a system in which data can be communicated between a client computer and a server, comprising the steps of transmitting character specifying data, which specifies a character, and font specifying data, which specifies a font of the character, from the client computer to the server; receiving the character specifying data and the font specifying data at the server; retrieving, at the server, character image data expressing a character, which has been specified by the received character specifying data, as an image in such a manner that the specified character will have a font specified by the received font specifying data; transmitting the character image data that has been found from the server to the client computer; and, in response to a situation where the character image data is not found, generating the character image data and transmitting the generated character image data from the server to the client computer.

In accordance with the present invention, the character specifying data and the font specifying data is transmitted from the client computer to the server. When the character specifying data and the font specifying data is received by the server, the server retrieves character image data representing a character specified by the character specifying data and possessing a font specified by the font specifying data.

If the character image data cannot be found by retrieval, the character image data is generated and the generated character image data is transmitted from the server to the client computer. If the character image data is found by retrieval, the found character image data is transmitted from the server to the client computer.

In accordance with the present invention, the character image data is transmitted from the server to the client computer. Even if the operating system of the client computer is different from that of the server, the character of a font that same as the font of a character represented by character image data generated by the server or character image data found by the server can be obtained at the client computer. In comparison with a case where outline fonts are sent and received between the client computer and the server, secondary use of fonts is limited. Even if a font has a copyright, therefore, the copyright can be protected.

It is preferred that the client computer have means for transmitting, to the server, size designating data representing the size of a character specified by the character specifying data, and that the retrieval means of the server retrieves, from the first character image data storage means, character image data expressing a character, which has been specified by the character specifying data and has a size that has been designated by the size designating data, as an image in such a manner that the specified character will have a font specified by the font specifying data.

Thus, a character having a specified size can be obtained at the client computer.

The client computer may have display control means (a display controller) for controlling a display device in such a manner that a frame of having the size of character represented based upon the size designating data will be displayed on a display screen.

Since a frame having the size of the character is displayed on the display device, the size of the character can actually be viewed.

The client computer further includes second character image data storage means (a second character image data storage device) for storing character image data representing a character as an image; determination means (a determination device) for determining whether character image data expressing a character as an image has been stored in the second character image data storage means, wherein this character has been specified by the character specifying data, has a font that has been specified by the font specifying data and a size that has been designated by the size designating data; and enlarging/reducing means (an enlarging/reducing device) which, in response to a determination by the determination means to the effect that the character image data has not been stored in the second character image data storage means, is for processing the character image data in such a manner that, of the character image data that has been stored in the second character image data storage means, a character image that has been specified by the character specifying data and has a font that has been specified by the font specifying data will be enlarged or reduced so as to take on a size that has been designated by the size designating data.

Image data representing a character image of a designated size can thus be obtained without sending or receiving character image data between the client computer and server. This makes it possible to lower cost.

It is preferred that the client computer further include font preview data storage determination means (a font preview data storage determination data) for determining whether font preview data, which is for displaying a representative character having a font specified by the font specifying data, has been stored; display control means for controlling a display device so as to display, on a display screen, the representative character represented by the font preview data in response to a determination by the font preview data storage determination means that the font preview data has been stored; and means (a transmitting device) for transmitting a font preview data transmission request to the server in response to a determination by the font preview data storage determination means that the font preview data has not been stored; and that the server include font preview data transmitting means for transmitting the font preview data to the client computer in response to the font preview data transmission request transmitted from the client computer.

Thus, a font possessed by a character represented by received character image data can be viewed by the user of the client computer in advance.

Further, the transmitting means of the client computer transmits, to the server, character string specifying data for specifying a combination of a plurality of characters constructing a character string, and font specifying data for specifying the fonts of the characters constructing the character string. The receiving means of the server receives the character string data and the font specifying data transmitted from the transmitting means. The retrieval means of the server retrieves, from the first character image data storage means, character image data expressing characters as images, wherein each of these characters, which construct the character string specified by the character string data, and has a font that has been specified by the font specifying data.

In this case a character string composed of a plurality of characters can be obtained by the character image data received at the client computer.

Further, the client computer may further include style data transmitting means (a style data transmitting device) for transmitting, to the server, character style designating data for designating style of a character specified by the character specifying data. The server may include designated character-style retrieval means (a designated character style retrieval device) for retrieving, from the first character image data storage means, designated-style character image data expressing, as an image, a character of a style designated by the character style designating data transmitted from the style data transmitting means; designated-style character image data generating means (a designated-style character image data generating device) for generating the designated-style character image data in response to a situation where the designated-style character image data is not found by the designated character-style retrieval means; and designated-style character image data transmitting means (a designated-style character image data transmitting device) for transmitting, to the client computer, the designated-style character image data generated by the designated-style character image data generating means or the designated-style character image data found by the designated character-style retrieval means.

Since the client computer receives the character image data and the designated-style character image data, it is possible to obtain not only a character image having a designated style (bold, italic, shadow, outline, embossed, engraved, superscript, subscript, etc.) but also character images having styles other than the designated styles represented by the character image data. It is easy to generate a character image of another style from character image data of a style other than a designated style.

Furthermore, the server may include style information transmitting means (a style information transmitting device) for transmitting, to the client computer, style information for generating the designated-style character image data, and the client computer may further include means (a generating device) for generating the designated-style character image data based upon the style information and the character image data transmitted from the style information transmitting means.

Thus, it is possible for the client computer to generate the designated-style character image data representing the character image of a designated style from the style information and character image data.

The client computer may further include character image data storage means (a character image data storage device) for storing the character image data transmitted from the character image data transmitting means.

The server may further include a printing device and means (a generating device) for generating new character image data, from the character image data that has been designated by the character image data generating means, so as to obtain a character image having a resolution suited to the resolution of the printing device.

If the printing device possessed by the server has a resolution higher than that of a printing device possessed by the client computer, it can print a character image whose resolution is higher than that of a character image printed by the printing device of the client computer. The character image that has been printed would be sent from the operator of the server to the user of the client computer by mail or the like.

The present invention further provides a recording medium storing a program for controlling the above-mentioned client computer and a recording medium storing a program for controlling the above-mentioned server.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 10a and 10b show layout information files;

FIG. 11 illustrates a file of default text attributes;

FIG. 12 shows a font ID table;

FIG. 20 shows an example of a preview area display;

FIG. 21 shows a state in which a line boundary character check (Japanese hyphenation) is not be implemented;

FIGS. 22a to 22c show examples of text displayed in a text area;

DESCRIPTION OF THE PREFERRED EMBODIMENT

Figure 1:
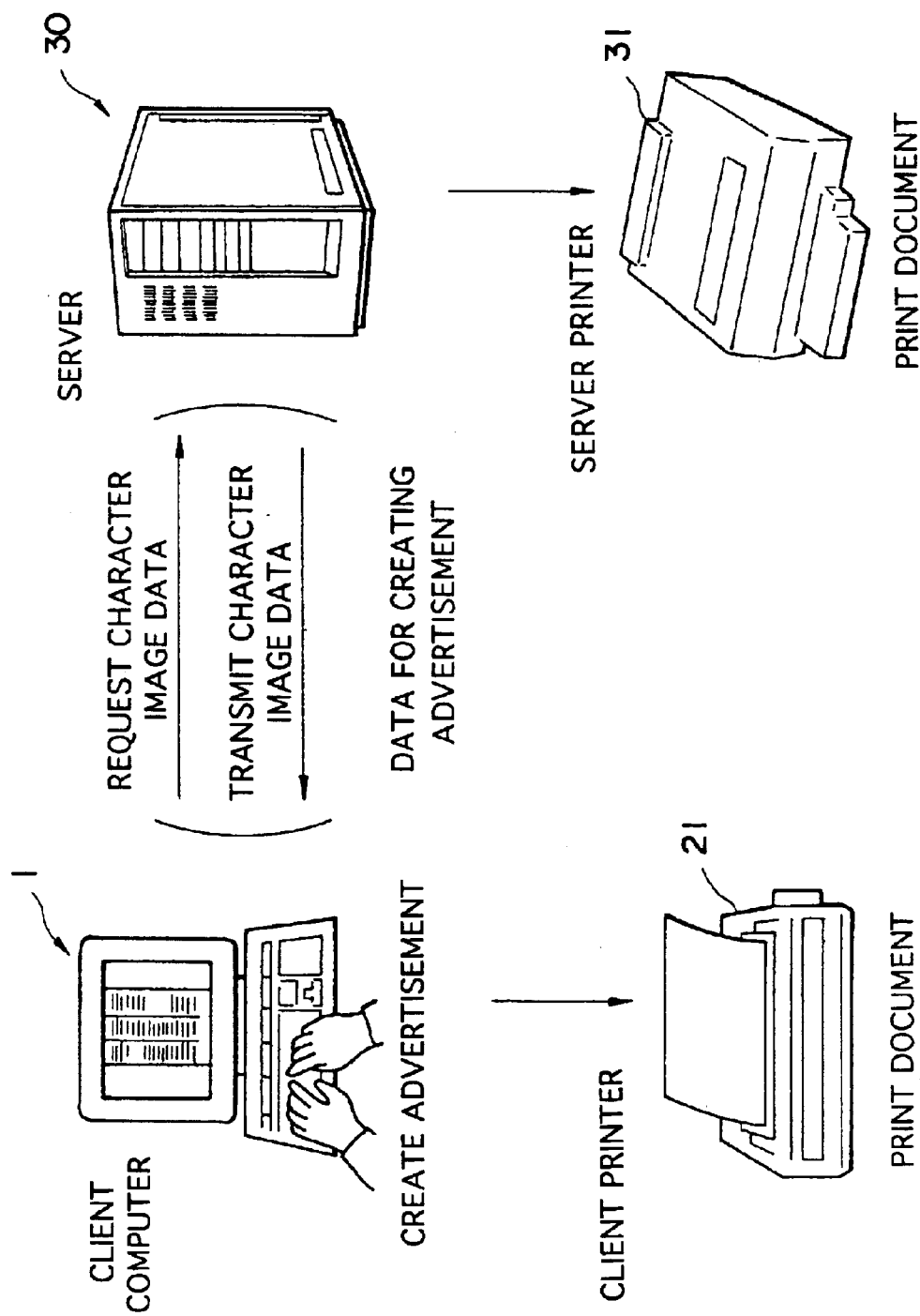
FIG. 1 illustrates the essential components of a font sharing system.

FIG. 1 illustrates the essential components of a font sharing system.

The present invention will be described in regard to a case where an advertisement is created using this font sharing system.

The font sharing system comprises a client computer 1 and a server 30 that are capable of communicating data with each other. A client printer 21 having a comparatively low resolution is connected to the client computer 1, and a server printer 31 having a comparatively high resolution is connected to the server 30.

A user employs the client computer 1 to create an advertisement. When the font of a character used in the advertisement has not been stored in the client computer 1, character image data (a bitmap text file, described later) expressing this character as an image is transmitted from the server 30 to the client computer 1. The advertisement is then created at the client computer 1 using the character expressed by the character image data that has been received. The advertisement is printed by the client printer 21 connected to the client computer 1, or advertisement creating data representing the advertisement is transmitted from the client computer 1 to the server 30 and the advertisement is printed by the server printer 31 connected to the server 30.

Figure 2:
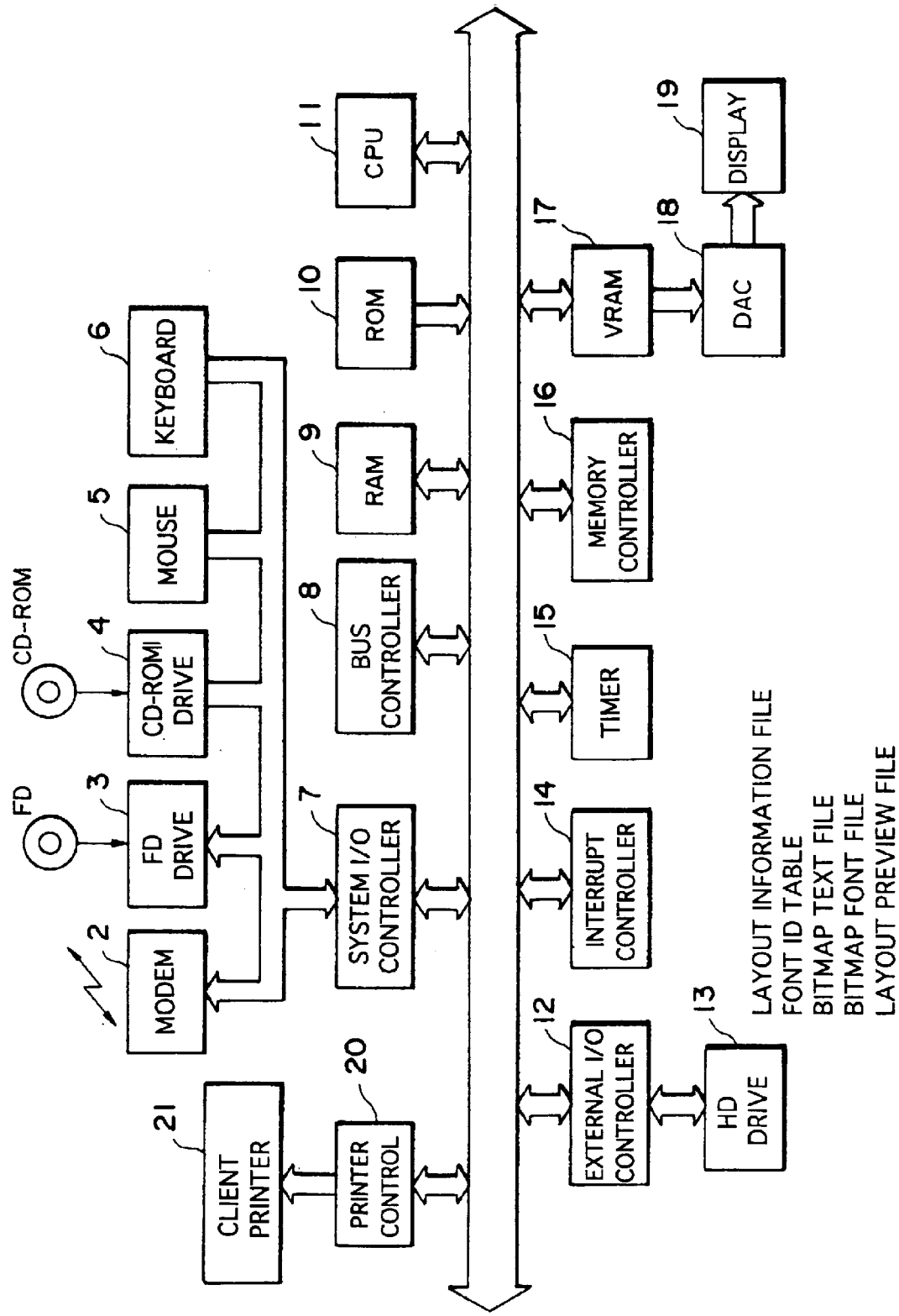
FIG. 2 illustrates the electrical construction of a client computer.

FIG. 2 is a block diagram showing the electrical construction of the client computer 1.

The overall operation of the client computer 1 is supervised by a CPU 11.

Connected to the client computer 1 are a modem 2 for through which the computer communicates data with the server 30, a floppy disk (FD) drive 3 for recording data on a floppy disk and reading data that has been recorded on the floppy disk, a compact disk read-only memory (CD-ROM) drive 4 for reading data that has been recorded on a CD-ROM, a mouse 5 and a keyboard 6. Data obtained from these devices 2 to 6 is loaded into the client computer 1 via a system I/O controller 7.

A program for creating an advertisement has been stored on a CD-ROM and is read by the CD-ROM drive 4 so as to be installed in the client computer 1.

The client computer 1 includes a bus controller 8, a RAM 9 for storing data temporarily and a ROM 10 for storing programs and other data that is necessary. A hard disk drive 13 is connected to the client computer 1 via an external I/O controller 12. Data is written to a hard disk (not shown) and data that has been recorded on the hard disk is read out by the hard disk drive 13.

A layout information file, a font ID table, a bitmap text file, a bitmap font file and a layout preview file, which will be described later, are recorded on the hard disk.

The client computer 1 further includes an interrupt controller 14, a timer 15, a memory controller 16 and a VRAM 17 for storing image data temporarily in order to display an image on a display device 19. Image data that has been recorded in the VRAM 17 is converted to an analog video signal by being applied to a digital/analog converter 18. The analog video signal is applied to the display device 19, whereby the image is displayed on the display screen of the display device 19.

The client printer 21 connected to the client computer 1 is controlled by a printer control circuit 20.

Figure 3:
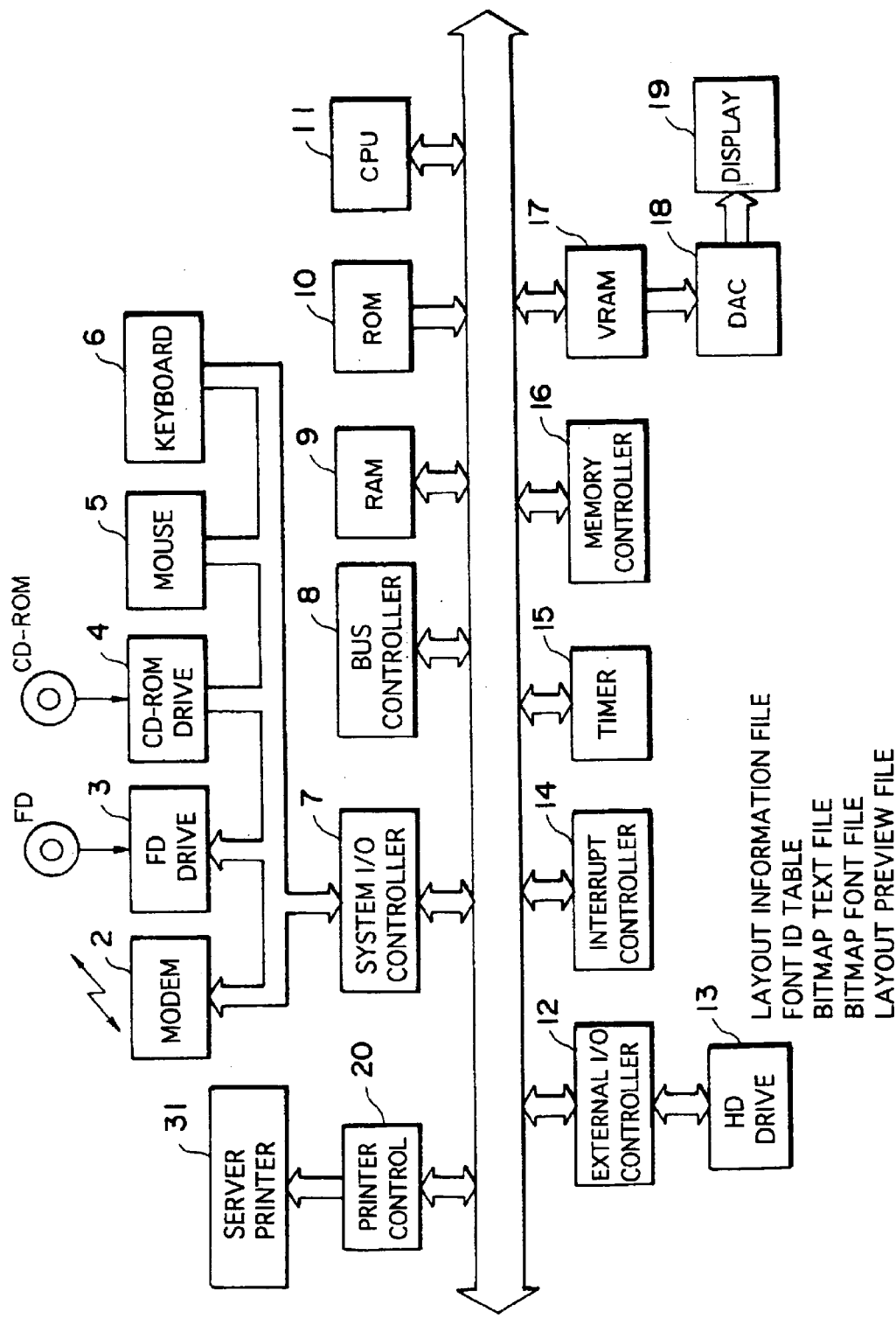
FIG. 3 illustrates the electrical construction of a server.

FIG. 3 is a block diagram showing the electrical construction of the server 30.

The server 30 has a construction identical with that of the client computer 1. The circuits constructing the server 30 that are the same as those constructing the client computer 1 are identified by like reference characters and need not be described again. The server 30 differs from the client computer 1 in that the high-resolution server printer 31 is connected thereto, as mentioned earlier.

Figure 4:
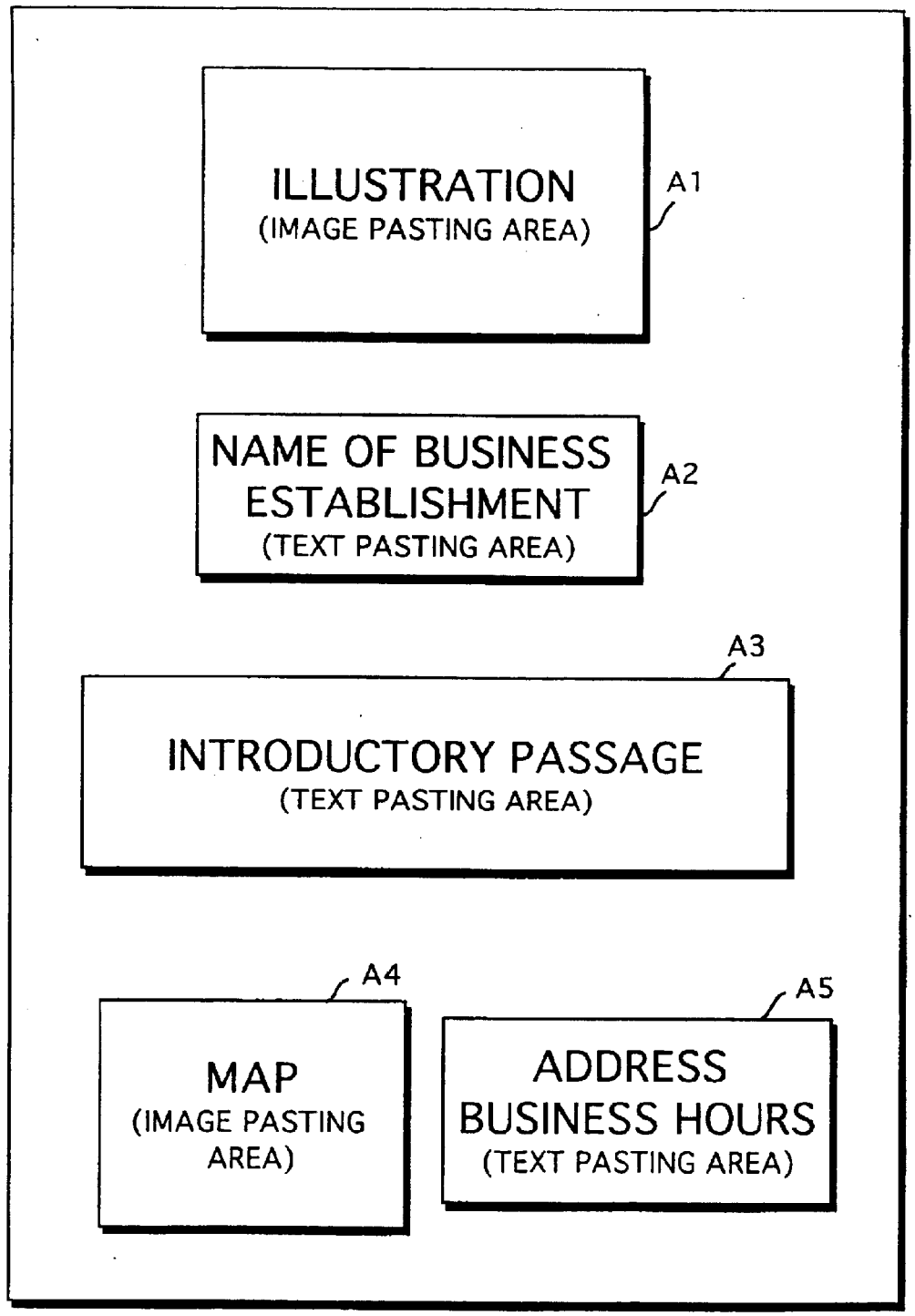
FIG. 4 illustrates a model of an advertisement.

FIG. 4 illustrates a model for the purpose of creating an advertisement.

Areas A1 to A5 are formed in the model of the advertisement. An illustration represented by image data is pasted in the area A1, character images of the name of a business establishment represented by character image data are pasted in the area A2, character images of an introductory passage represented by character image data is pasted in the area A3, a map represented by image data is pasted in the area A4, and character images of an address and business hours represented by character image data are pasted in the area A5. The areas A2, A3 and A5 in which the character images (characters in the form of images expressed by the character image data) are pasted shall be referred to as text pasting areas, and the areas A1 and A4 in which pictures (images) are pasted shall be referred to as image pasting areas.

Figure 5:
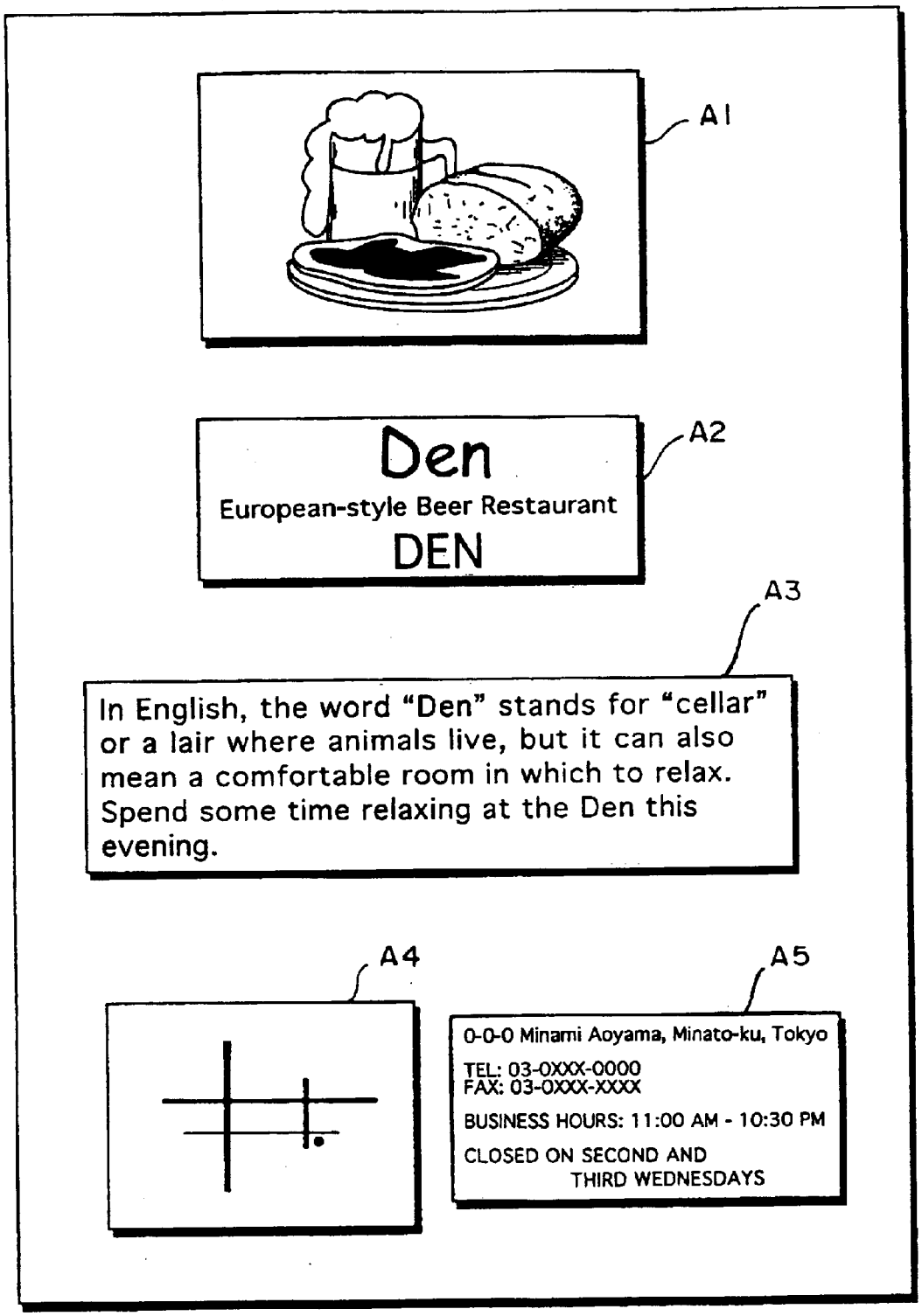
FIG. 5 shows the advertisement.

An advertisement of the kind shown in FIG. 5 is created by pasting illustrations and the like in the areas of the model depicted in FIG. 4.

Figure 6:
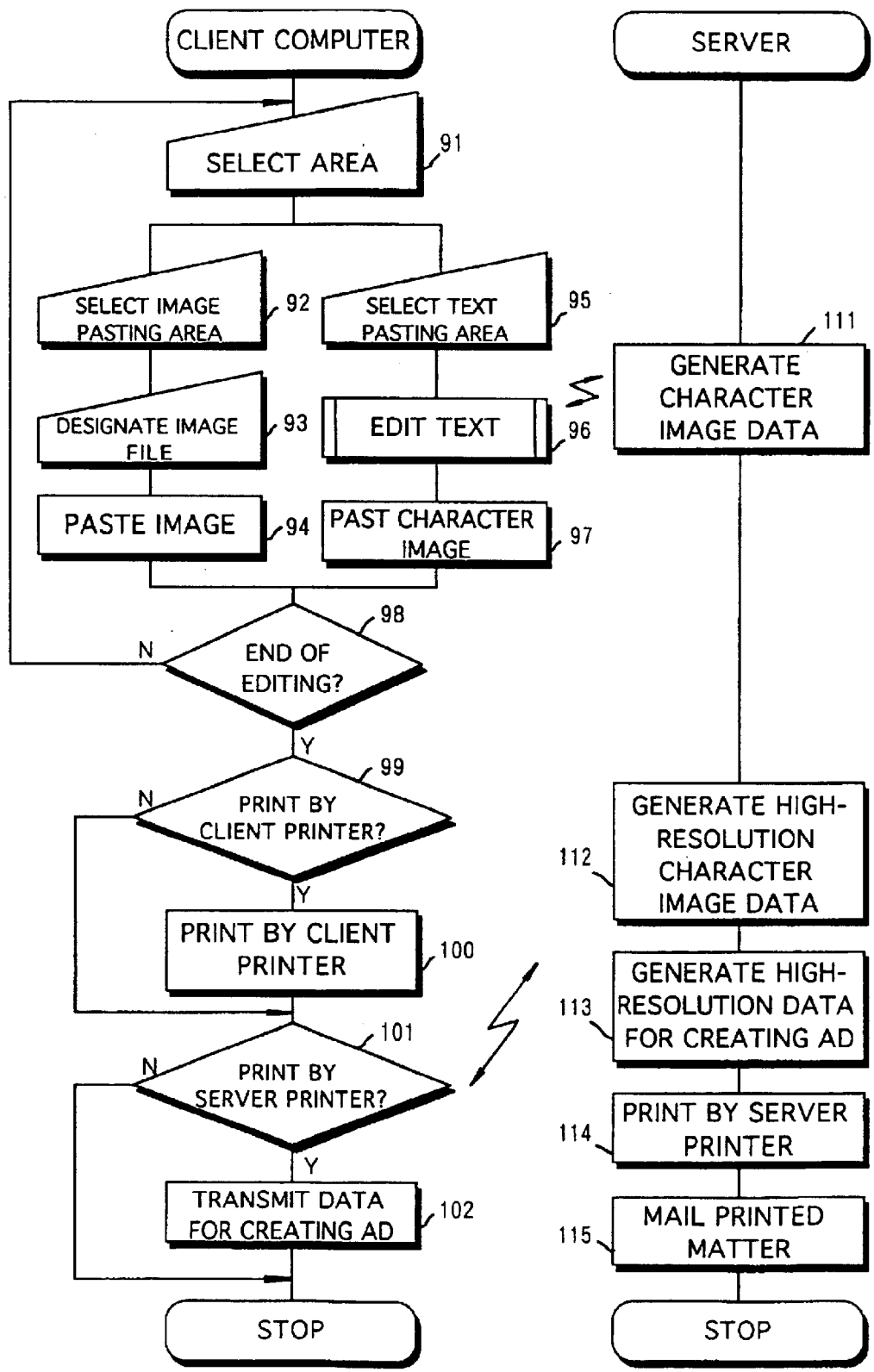
FIG. 6 is a flowchart showing a processing procedure for creating an advertisement.

FIG. 6 is a flowchart showing a processing procedure for creating an advertisement.

The user first creates the advertisement model shown in FIG. 4. When the model shown in FIG. 4 is created by the user, areas for pasting pictures or character images are selected from among the areas A1 to A5 in the created model (step 91).

If a selected area is area A1 or A4 in which a picture is pasted (step 92), an image file (which has been stored on the hard disk) containing the image data expressing the pasted picture is designated (step 93). When the image file is designated, the image expressed by the image data that has been stored in this image file is pasted in the designated area A1 or A4 (step 94). It goes without saying that the image may be enlarged or reduced in size in dependence upon the size of the area.

If the selected area is area A2, A3 or A5 for pasting the character images (step 95), text editing processing is executed (step 96). In text editing processing, data is communicated with the server 30 and the server 30 generates character image data (step 111). This text editing processing, which will be described later, provides character image data that expresses characters and images. The character images expressed by the character image data are pasted in the selected area A2, A3 or A5 (step 97).

The processing of steps 91 to 97 is repeated until the pasting of pictures or character images in all areas A1 to A5 of the model created beforehand is completed ("YES" at step 98).

Next, whether the advertisement is to be printed by the client printer 21 connected to the client computer 1 or by the server printer 31 connected to the server 30 is decided by the user of the client computer 1 (step 99). In a case where the advertisement is to be printed using the client printer 21, the data for creating the advertisement is applied to the client printer 21 and is printed thereby (step 100). If the advertisement is to be printed using the server printer 31 connected to the server 30, the data for creating the advertisement is transmitted from the client computer 1 to the server 30 (step 102). If the data for creating the advertisement is received, high-resolution character image data is generated at the server 30 to create a high-resolution advertisement (step 112) and advertisement creating data which supports the resolution of the server printer 31 is generated again (step 113).

The advertisement creating data thus regenerated is applied to the server printer 31 of the server 30 and the high-resolution advertisement is printed thereby (step 114). When the advertisement has been printed, the printed advertisement is mailed to the user of the client computer 1 by the operator of the server 30 (step 115).

Text editing processing (the processing of step 96 in FIG. 6) will be described next. Here a case where character images are pasted in the areas shown in FIGS. 4 and 5 will be described.

When the advertisement model is created and an area (here the area A2) in which character images are pasted is selected in the manner described above, control proceeds to the text editing processing.

Figure 7:
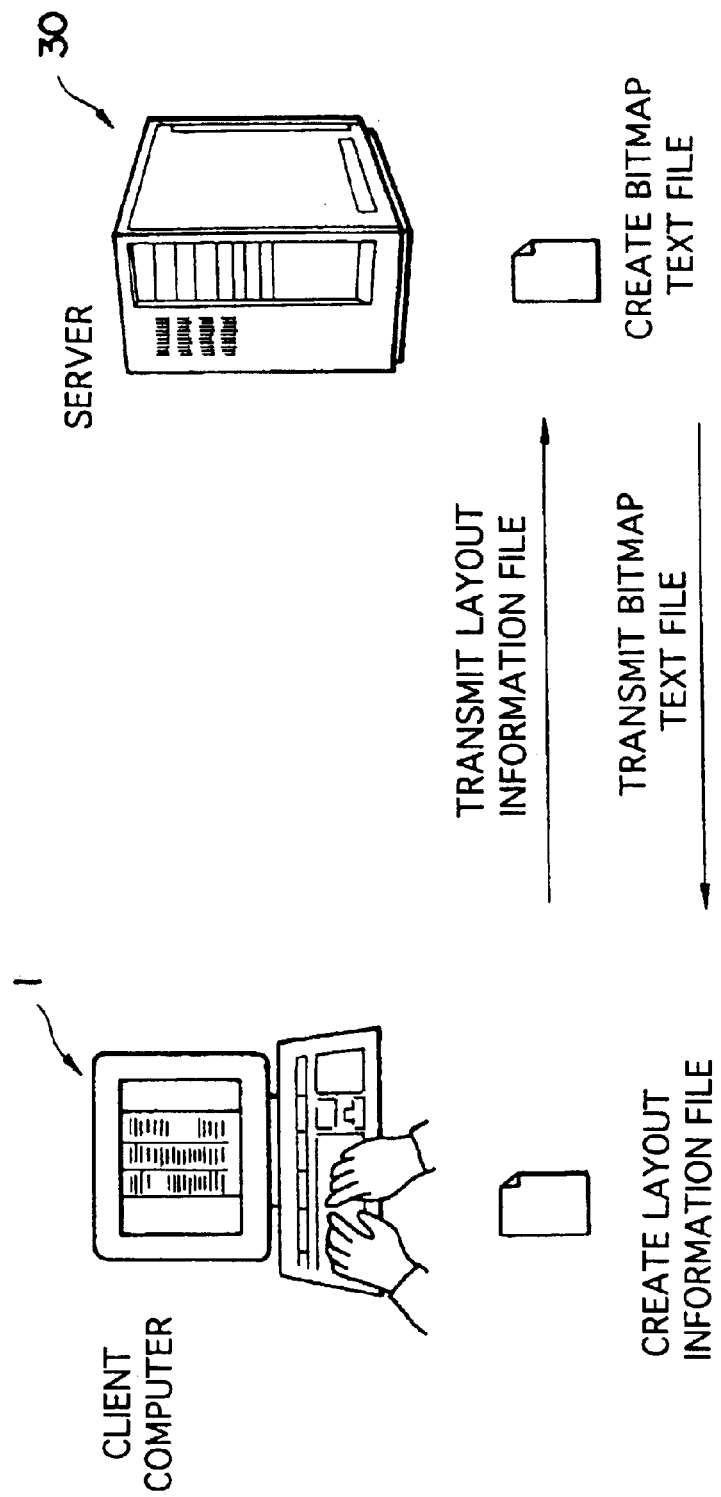
FIG. 7 illustrates a client computer and a server.

FIG. 7 illustrates the relationship between the client computer 1 and the server 30.

In text editing processing, a layout information file (see FIGS. 9, 10a, 10b) is created by the user of the client computer 1. The created layout information file is transmitted from the client computer 1 to the server 30.

On the basis of the layout information file, the server 30 creates a bitmap text file (see FIGS. 13a, 13b) in which character image data has been stored. The created bitmap text file is transmitted from the server 30 to the client computer 1.

Upon receiving the bitmap text file, the client computer 1 reads out the character image data that has been stored in the bitmap text file. The character images expressed by the character image data that have been read out are pasted in the area A2.

Further details of text editing processing will become apparent from the description that follows.

Figure 8:
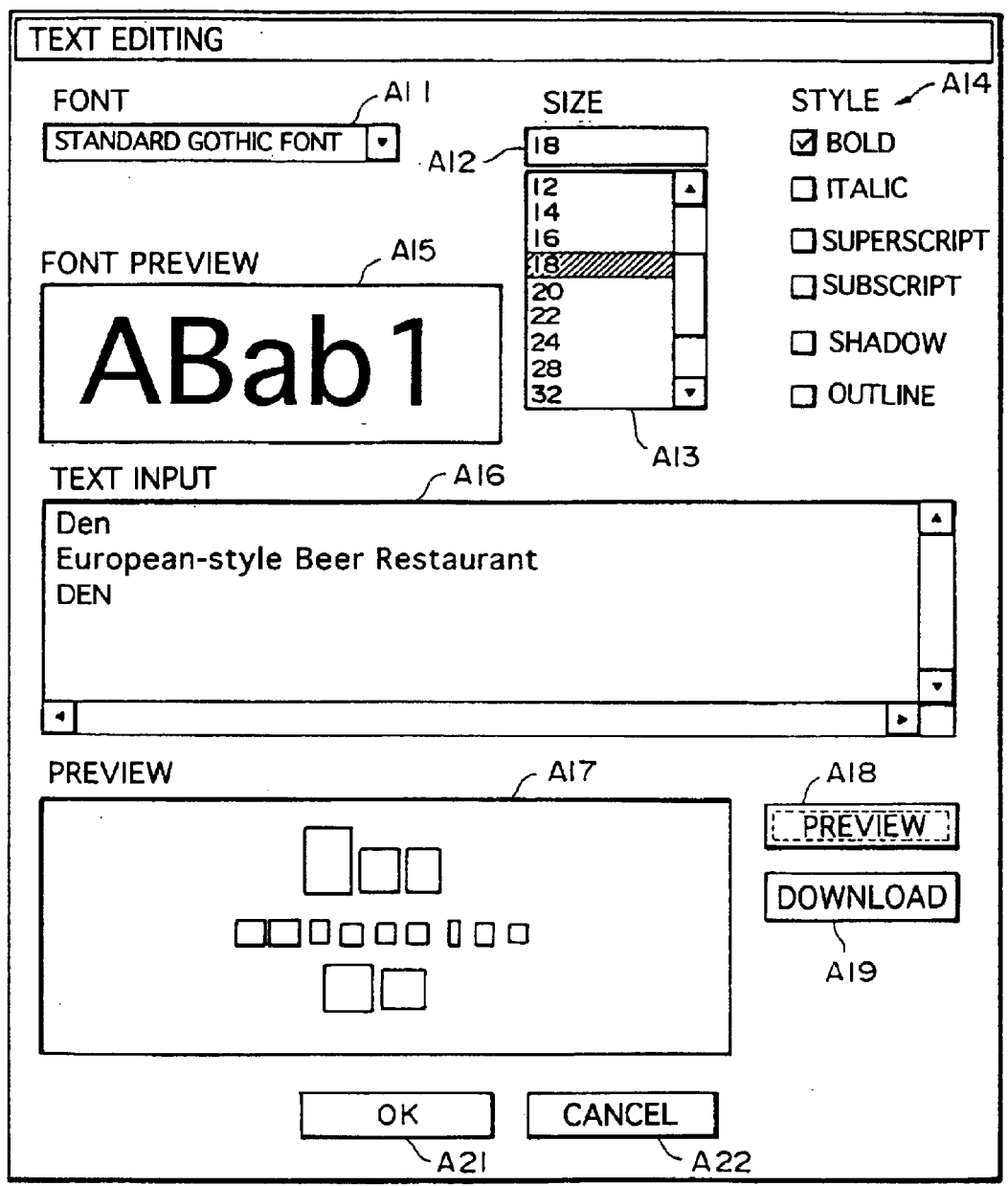
FIG. 8 shows a text editing window.

First, a text editing window shown in FIG. 8 is displayed on the display screen of the display device 19 of the client computer 1.

The text editing window includes an area A11 for selecting the font of a character image to be pasted in an area; an area A12 which displays the size of a character image to be pasted in an area; an area A13 for selecting the size of this character image; an area A14 for designating the style of a character image (in this embodiment, bold, italic, superscript, subscript, shadow and outline can be designated as character styles); a font preview area A15 for displaying, in regard to representative characters, the font that has been designated by the font selection area A11; a text input display area A16 which displays characters entered by the user of the client computer 1; a preview area A17 in which the layout of characters to be pasted in an area is displayed by frames in accordance with the sizes of the characters, and which is for previewing character images; an area A18 clicked on by the user of the client computer 1 when frames are displayed in the preview area A17; an area A19 clicked on by the user of the client computer 1 when character image data expressing character images is downloaded from the server 30; an area A21 clicked on by the user of the client computer 1 when character images are finally pasted in a selected area of the model; and an area A22 clicked by the user of the client computer 1 when the user wishes to cancel an entry. It goes without saying that a return key on the keyboard 6 is pressed when a new line is started in the text input display area A16.

Figure 9:
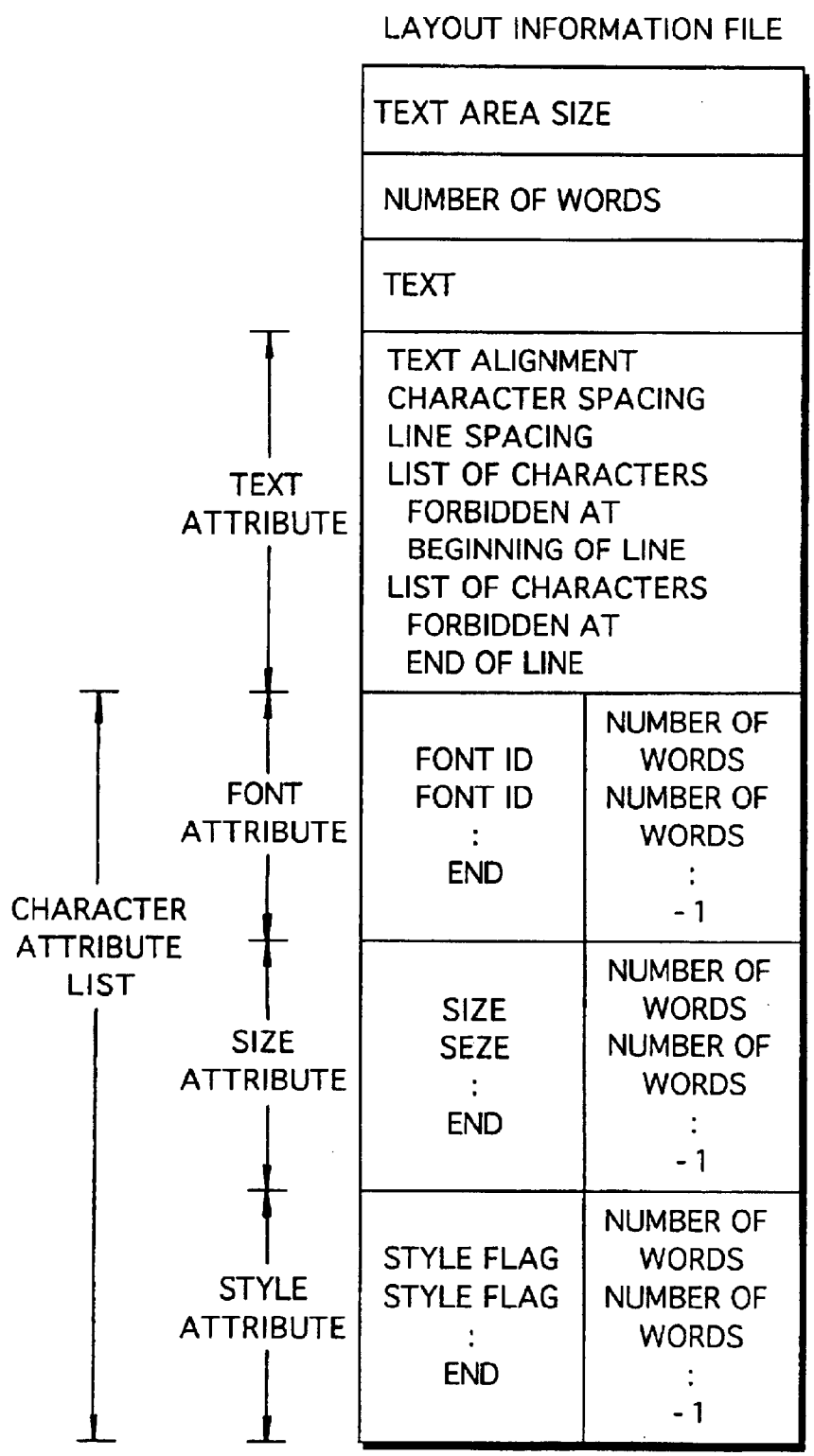
FIG. 9 shows a layout information file.

FIG. 9 illustrates the format of the layout information file created by the user of the client computer 1.

The layout information file includes a text area size recording area which stores data representing the size of an area selected by the user; a character count recording area which stores data representing the number of characters of character images entered in a text pasting area selected by the user (in a case where the return key is pressed, this event is counted as one word); and a text area for storing data representing a character to be entered in an area.

The layout information file further includes a text attribute area and a character attribute list area.

The text attribute area includes areas for storing data representing the alignment of entered text (whether a character string is to be centered, justified left or justified right), character spacing, line spacing, a list of characters forbidden at the beginning of a line (e.g., a punctuation mark), and a list of characters forbidden at the end of a line (e.g., a left parenthesis). Data that is stored in the text attribute area may be determined in advance in the manner shown in FIG. 11.

The character attribute list includes a font attribute area, a size attribute area and a style attribute area.

The font attribute area is an area for storing font IDs which designate the fonts of entered characters. A font ID table of the kind shown in FIG. 12 is stored in the client computer 1 and server 30 beforehand. The font of a character image is specified by specifying the font ID. The size attribute area is an area for storing data which designates the size of an entered character. The style attribute area is an area for storing data which designates the style of an entered character. These items of data are stored in the respective areas in correspondence with the entered characters.

FIGS. 10a and 10b illustrate the manner in which the data has been stored in the layout information file. FIG. 10a shows the initial state. Here data has been stored only in the text area size and text attribute area. FIG. 10b illustrates the final state, in which data has been stored.

In the example shown in FIG. 10b, the nine words "Den European-style Beer Restaurant DEN" have been entered in the selected text information area A2. The return key has been pressed between "Den" and "European-style Beer Restaurant" and between "European-style Beer Restaurant" and "DEN" to start new lines. A font (Fujimaru Comic; see FIG. 12) represented by "FC0023" has been designated for the first word (Den), a font (Fujimaru Block; see FIG. 12) represented by "FK001" has been designated for the next three words (European-style Beer Restaurant), and a font (Fujimaru Gothic; see FIG. 12) represented by "FG002" has been designated for the last word (DEN). A size represented by "84" has been designated for the first word, a size represented by "32" has been designated for the next three words, and a size represented by "54" has been designated for the last word. In the example shown in FIG. 10b, a style has not been designated in regard to any of the entered characters.

This layout information file is generated in text editing processing by the user of the client computer 1 and is recorded on the hard disk of the client computer 1.

Figure 13:
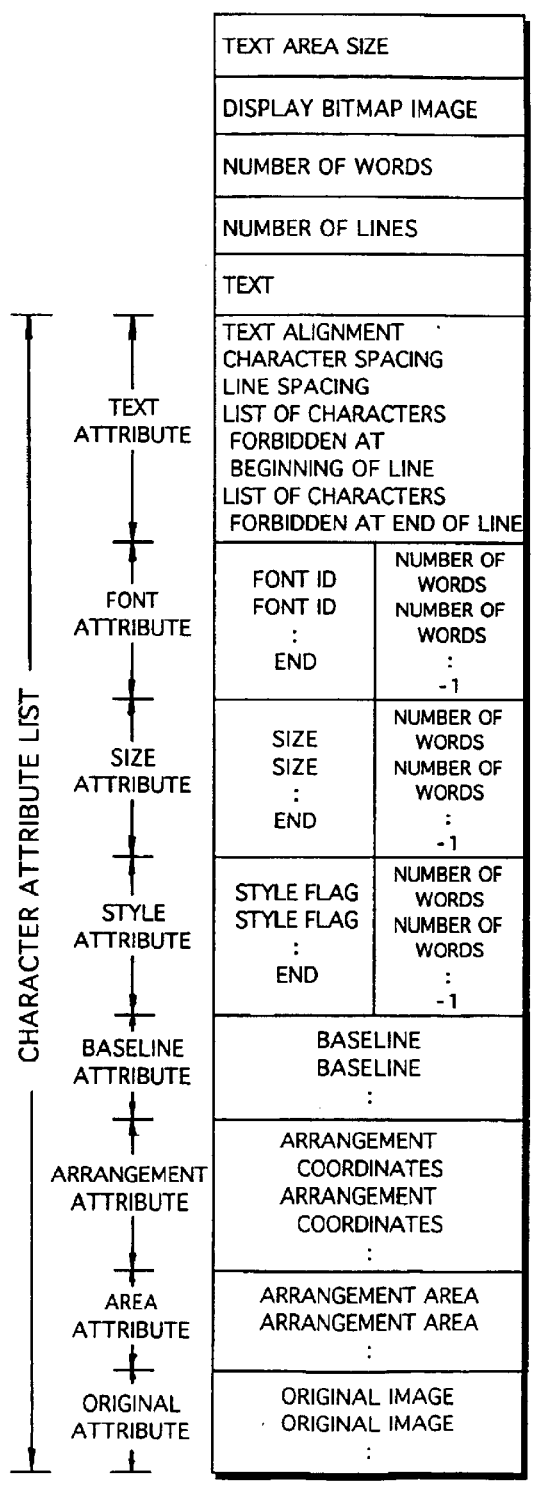
FIGS. 13a and 13b show a bitmap text file.

FIG. 13a shows the format of a bitmap text file generated at the server 30, and FIG. 13b illustrates a bitmap text file in which specific data has been stored.

The bitmap text file includes an area (text area size) for storing data which represents the size (represented by number of pixels in the vertical direction and number of pixels in the horizontal direction) of a selected text pasting area; an area (display bitmap image) for storing character image data expressing character images to be pasted to the size of the selected text pasting area; an area (word count) for storing data which represents the number of characters constructing character images to be pasted in a selected text pasting area; an area (line count) for storing data which represents the number of lines of characters constructing character images to be pasted in a selected text pasting area; and a text recording area (text) for storing data which represents characters entered by the user.

The bitmap file further includes a text attribute area and a character attribute list area similar to those of the layout information file.

Data stored in the text attribute area is the same as data stored in the above-mentioned layout information file and need not be described again. Data stored in the text attribute area is copied from the data that has been stored in the layout information file.

The character attribute list area includes, in addition to the font attribute area, size attribute area and style attribute area contained in the layout information file, a baseline attribute area, an arrangement attribute area, an area attribute area and an original attribute area. Data stored in the font attribute area, size attribute area and style attribute area is the same as the data stored in the layout information file and need not be described again. Data stored in the font attribute area, size attribute area and style attribute area of the bitmap text file is copied from the data that has been stored in the layout information file.

Data stored in the baseline attribute area, arrangement attribute area and area attribute area is data representing the pasting position of characters pasted as images of a selected text area and data stipulating the sizes of characters.

Figure 14:
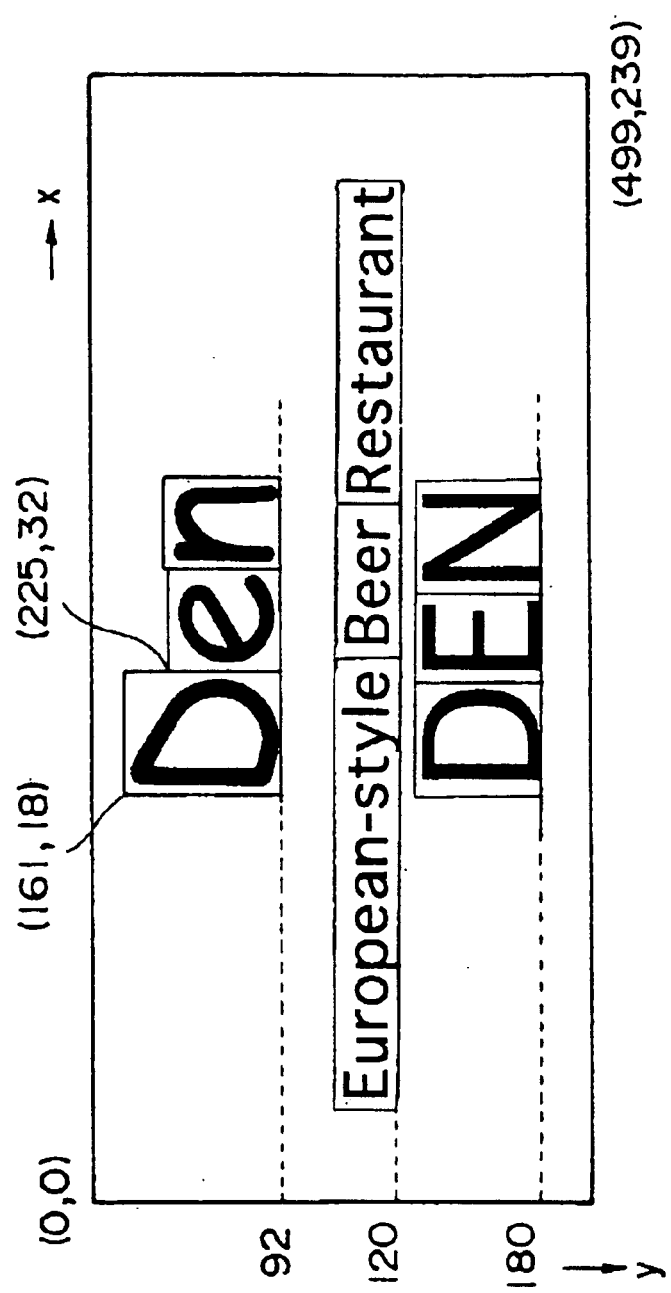
FIG. 14 shows an example of character images displayed in a text area.

FIG. 14 shows the selected text pasting area A2. Character images appear in this text pasting area at the pasting positions.

Data stored in the baseline attribute area represents, on a per-line basis, reference positions below the characters constructing the character images pasted in the text pasting area that has been selected. Since character images spanning three lines are pasted in the selected text pasting area in this embodiment, each of the items of data representing the reference positions of the three lines is stored in the baseline attribute area. By taking the point at the upper left of a text area as the origin (0,0), a reference position is expressed by the number of pixels from the origin in the vertical (Y) direction. For example, the characters constituting the first line are regulated in such a manner that the baseline of the characters will be situated at a position that is 92 pixels distant from the origin in the vertical direction. The characters constituting the second line are regulated in such a manner that the baseline of the characters is situated at a position that is 120 pixels distant from the origin in the vertical direction. The characters constituting the third line are regulated in such a manner that the baseline of the characters is situated at a position that is 180 pixels distant from the origin in the vertical direction.

Data stored in the arrangement attribute area indicates the positions of the characters constructing the character images pasted in the text pasting area that has been selected. In a case where each character is enclosed by a frame corresponding to the size of the character, the position of the character is indicated by the position (number of pixels in the x direction and number of pixels in the y direction) of the point at the upper left of the frame. For example, by taking the point at the upper left of the text pasting area as the origin (0,0), the position of the character "D" among the character images pasted in the selected text area is regulated in such a manner that the point at the upper left of the frame will be situated at the position (161,18). If the character is the character "e", its position is regulated in such a manner that the point at the upper left of the frame will be situated at the position (225,32).

Data stored in the area attribute area indicates the size of each character constructing character images pasted in the text area. In a case where each character is enclosed by a frame corresponding to the size of the character, size is indicated by the horizontal width and vertical length of the frame. For example, if the character among the character images pasted in the selected text area is the character "D", size is stipulated by a horizontal width of 64 (=225−161) pixels and a vertical length of 74 (=92−18) pixels.

When a style designating flag for style designation has been stored in the style attribute area so as to obtain a prescribed style, data expressing a character image of a style represented by the data that has been stored in this style attribute area is stored in the display bitmap image area. However, if the client computer 1 possesses image data representing not only character images of specific styles but also character images having standard styles (the Ming-style typeface, Gothic typeface, etc.), a character image having a style different from that of the standard character image can be generated with relative ease from the image data expressing the standard character image. To accomplish this, in a case where a style designation has been made by the user of the client computer 1, image data representing the standard image, in addition to the image data representing the image of the designated style, is transmitted from the server 30 to the client computer 1 as original image data. The area which stores the original image data is the original attribute area.

This bitmap text file is generated by the server 30.

Figure 15:
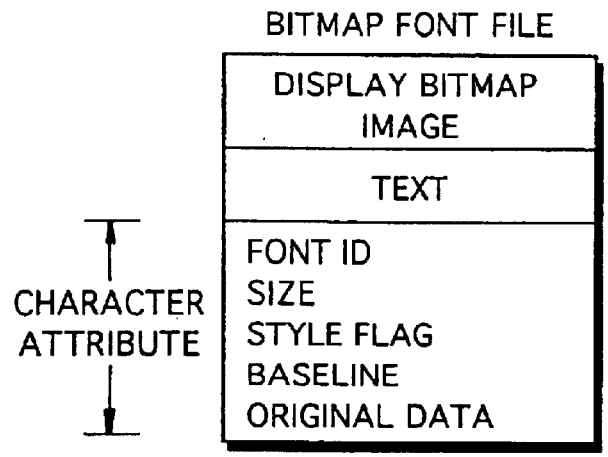
FIG. 15 shows a bitmap font file.

FIG. 15 illustrates the format of a bitmap font file.

The bitmap font file is generated from the bitmap text file.

The bitmap font file includes a display bitmap image area, a text recording area and a character attribute area. Data representing the font ID, data representing size, data representing a style flag and data representing a baseline is stored in the character attribute area. Further, when data representing an original image is present, the data representing this original image is stored as well.

Figure 16:
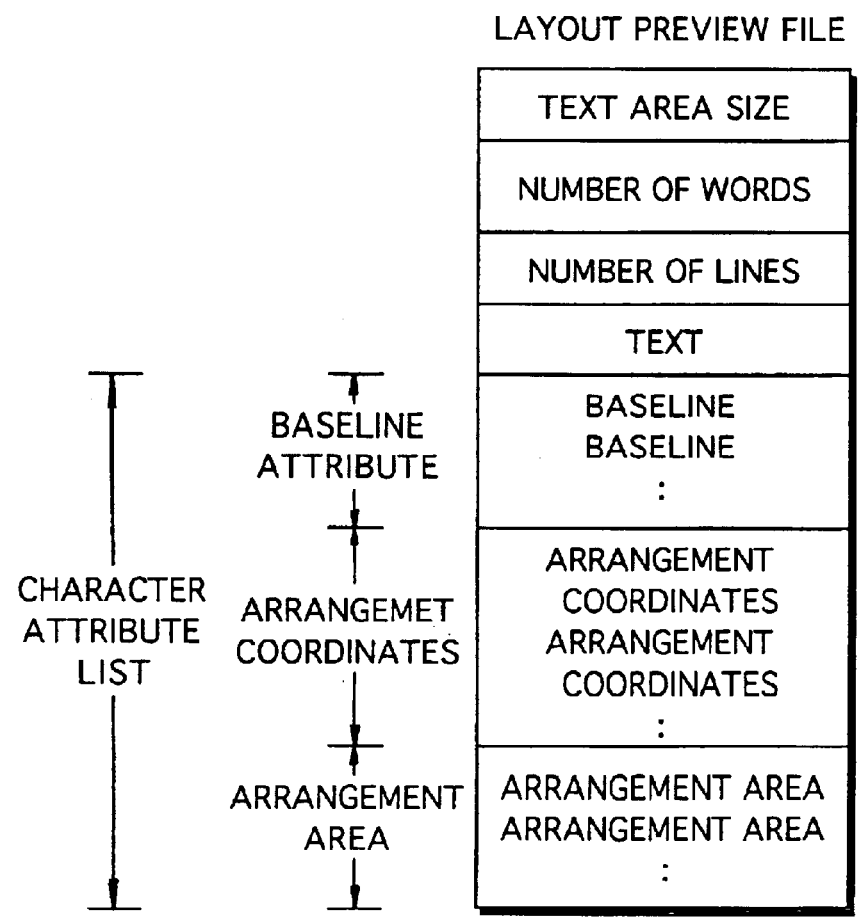
FIG. 16 shows a layout preview file.

FIG. 16 illustrates the format of the layout preview file.

The layout preview file indicates the layout in the preview area A17 shown in FIG. 8. This layout preview file is generated from the bitmap text file transmitted from the server 30.

The layout preview file includes a text area size recording area, a word count recording area, a line count recording area, a text recording area and a character attribute list area. The character attribute list includes a baseline attribute area, an arrangement attribute area and an area attribute area.

Figure 17:
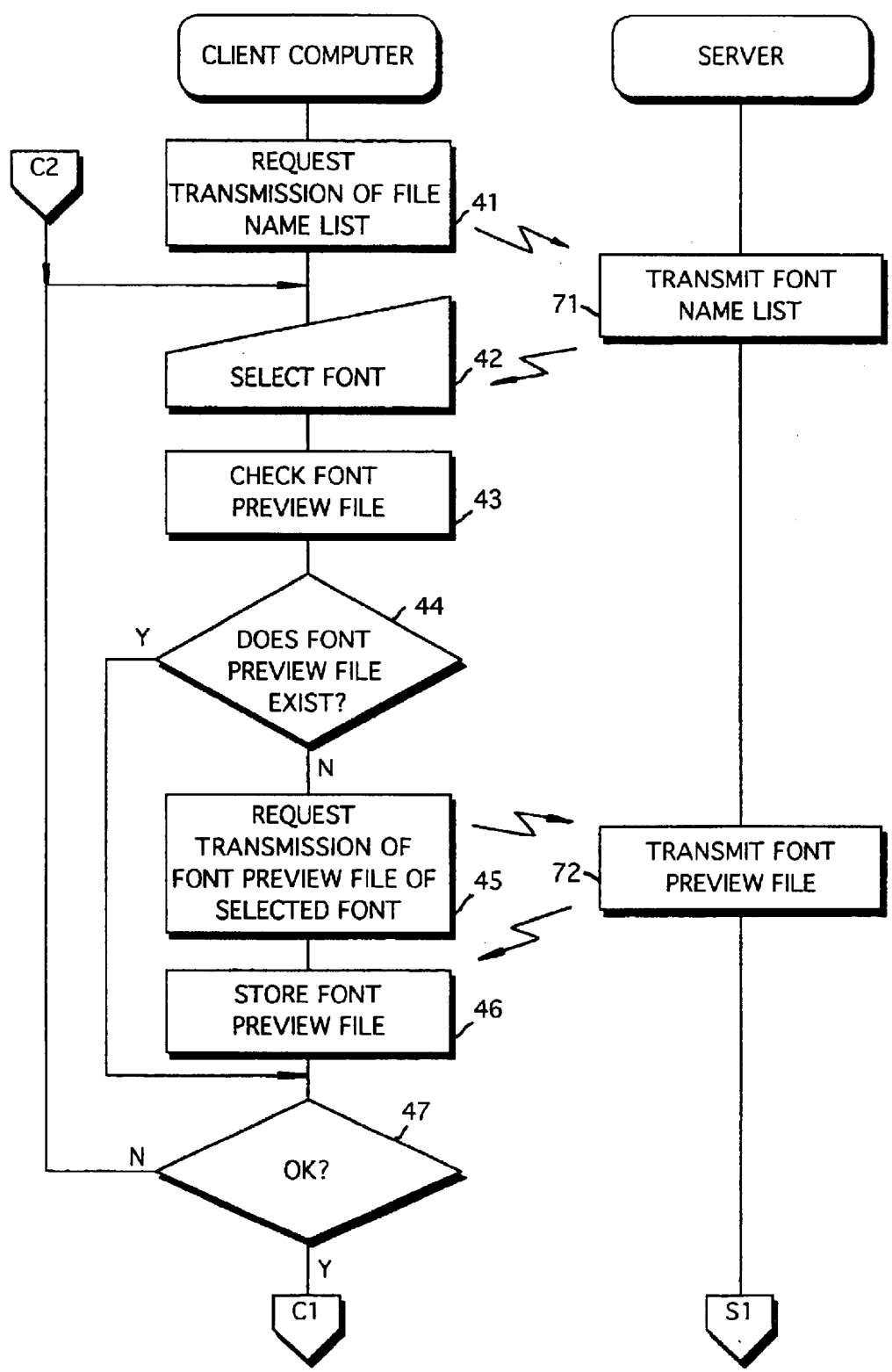
FIGS. 17 to 19 are flowcharts showing the procedure of text editing processing.
Figure 18:
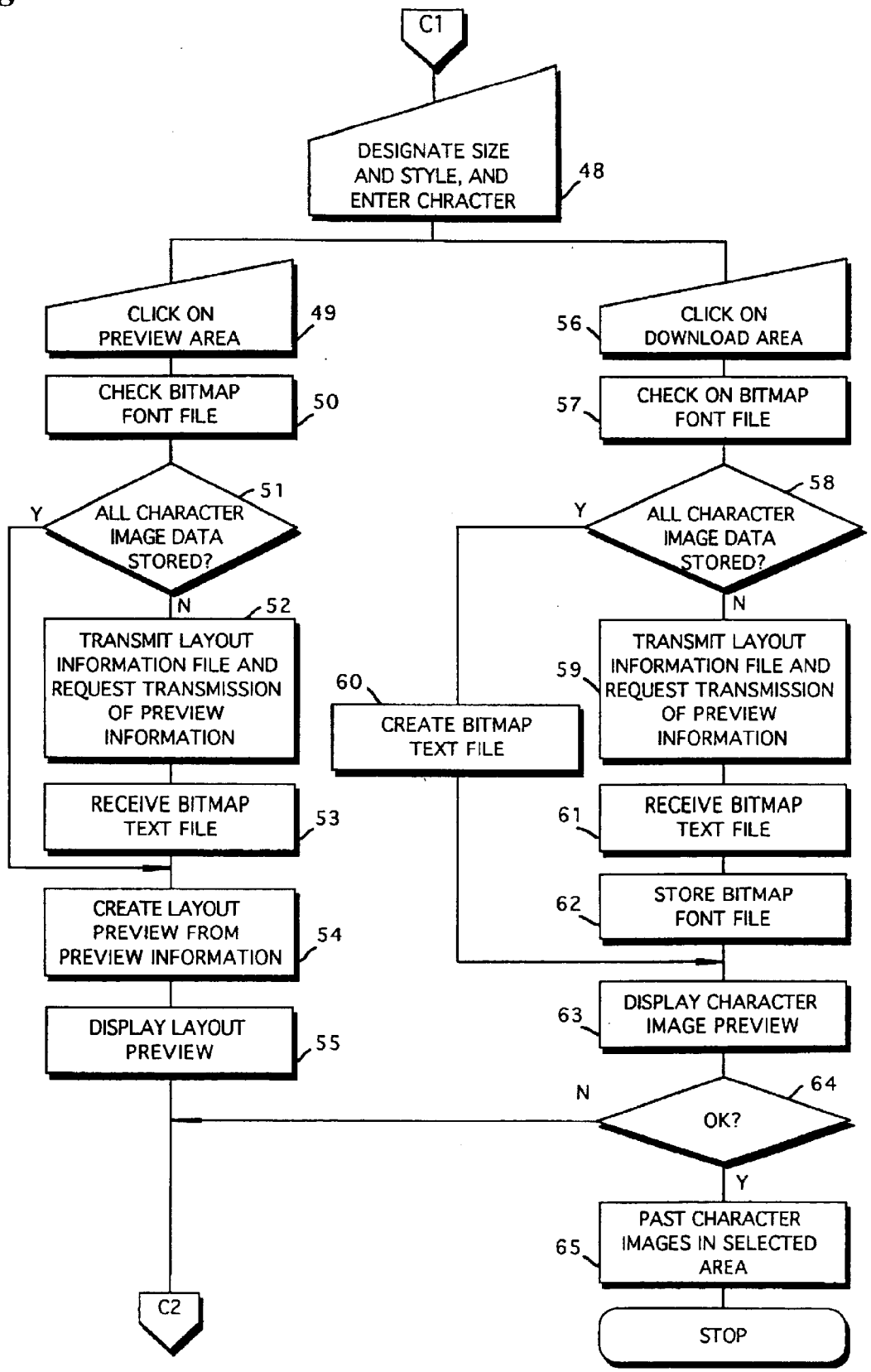
Figure 19:
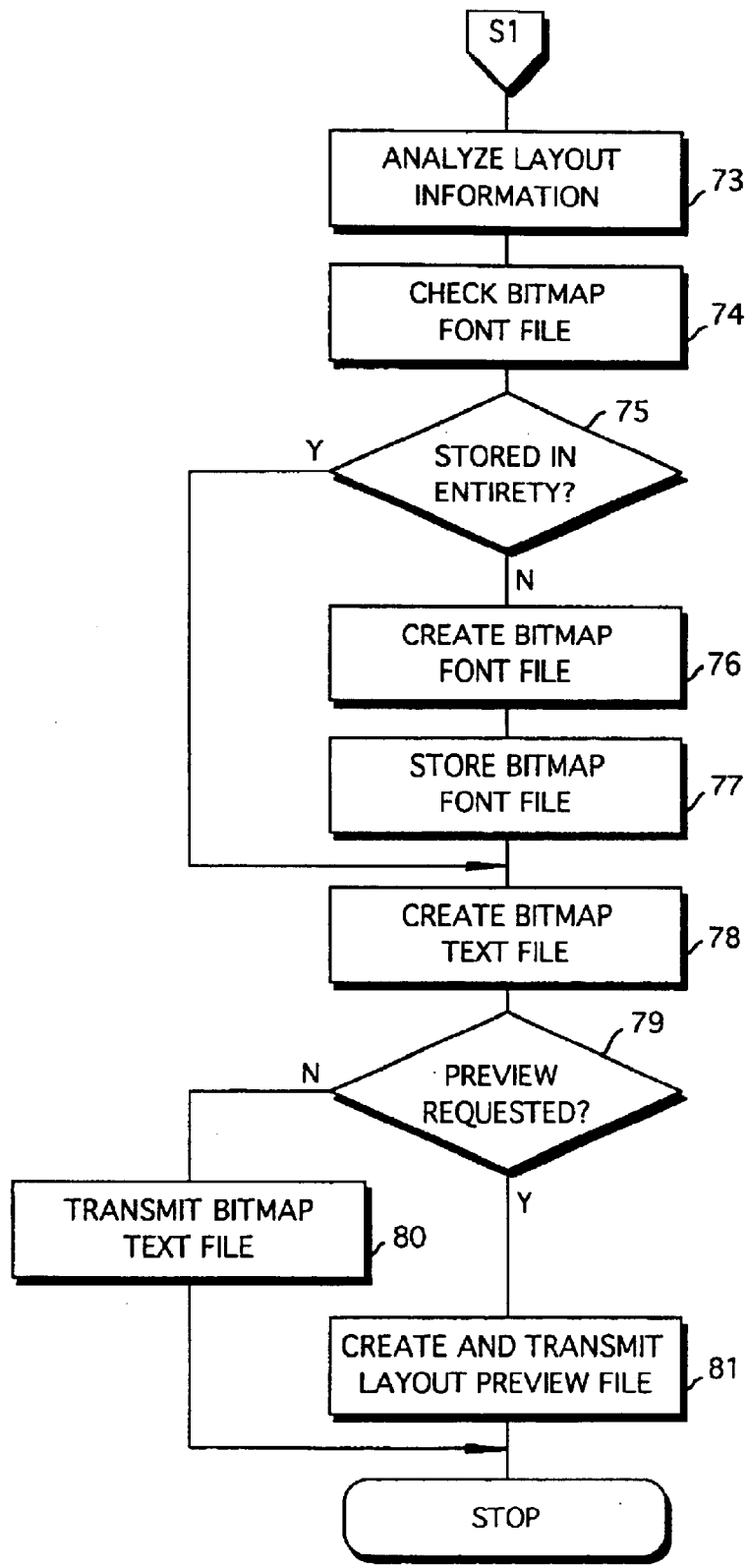

FIGS. 17 to 19 are flowcharts illustrating the procedure of text editing processing (the processing of step 96 in FIG. 6).

First, a request of a list of font names is transmitted from the client computer 1 to the server 30 (step 41).

Upon receiving the request for the list of font names from the client computer 1, the server 30 responds by transmitting data representing the list of font names to the client computer 1 (step 71). When data representing the list of font names has already been stored in the client computer 1, the processing of steps 41 and 71 is skipped.

Upon receiving the data representing the list of font names, the client computer 1 displays the font names as a list in the area A11 based upon the data received. The user of the client computer 1 selects the desired font from the fonts displayed in the area A11 (step 42).

It is determined whether font preview data which appears in regard to a typical character having a selected font has been stored on the hard disk of the client computer 1 (steps 43, 44).

If font preview data corresponding to the selected font has not been stored on the hard disk of the client computer 1 ("NO" at step 44), then a request for the font preview data is transmitted from the client computer 1 to the server 30 (step 45).

Upon receiving the request for the font preview data transmitted from the client computer 1, the server 30 responds by transmitting the corresponding font preview data from the server 30 to the client computer 1 (step 72).

Upon receiving the font preview data transmitted from the server 30, the client computer 1 records this data on the hard disk (step 46).

In any case, the font represented by the font preview data is displayed in the area A15. The user of the client computer 1 views the displayed font and, if it is acceptable, control proceeds to the next processing step. If the font is not acceptable to the user, then processing is repeated from step 42 ("NO" at step 47).

A character (character string) to be displayed in the selected text pasting area is entered using the keyboard 6 of the client computer 1. When the character is entered, the entered character is displayed in the text input display area A16. Further, the size of each entered character is selected from the sizes displayed in the area A13. The size selected is displayed in the area A12. If necessary, a style being displayed in the area A14 is designated. The box to the left of the designated style is checked (step 48 in FIG. 18). As a result of these operations, the layout information file (see FIGS. 8, 9a and 9b) is created.

When text is thus entered, control shifts to layout preview processing or character image display processing.

If the area A18 is clicked on by the user of the client computer 1, control proceeds to layout preview processing (step 49). If the area A19 is clicked on by the user of the client computer 1, then control proceeds to character image display processing (step 56).

A case where the area A18 is clicked on to shift to layout preview processing will be described first.

When control proceeds to layout preview processing, first reference is had to the bitmap font file that has been recorded on the hard disk (step 50). It is determined whether all of the character image data expressing characters having fonts, sizes and styles designated by the user and that has been entered by the user has been stored in the bitmap font file recorded on the hard disk (step 51).

If there is character image data that has not been stored in the bitmap font file, the layout information file that was generated by the character input processing of step 48 and a request for preview information are transmitted from the client computer 1 to the server 30 (step 52).

Upon receiving the layout information file and preview information request from the client computer 1, the server 30 analyzes the layout information file that has been received (step 73 in FIG. 19). It is determined, in conformity with the results of analysis, whether a bitmap font file corresponding to the received layout information file has been recorded on the hard disk of the server 30 (step 75).

If a corresponding bitmap font file has not been recorded on the hard disk of the server 30, the corresponding bitmap file is generated based upon the received layout information (step 76). The generated bitmap font file is recorded on the hard disk of the server 30 (step 77).

A bitmap text file also is generated (step 78).

Since a request for transmission of the layout preview information has been issued in this case ("YES" at step 79), the layout preview file is generated and the generated layout preview file is transmitted from the server 30 to the client computer 1 (step 81).

Upon receiving the layout preview file transmitted from the server 30 (step 53 in FIG. 18), the client computer 1 generates data for display in the layout area A17 based upon the bitmap font file recorded on the hard disk of the client computer 1 or layout preview file transmitted from the server 30 (step 54). On the basis of the generated data, frames the number of which agrees with the number of entered characters and which have the sizes of the character sizes set by the user of the client computer 1 are displayed (step 55; see area A17 in FIG. 8).

Since frames conforming to the set sizes are displayed in the preview area A17 in a number corresponding to the number of entered characters, the user can tell what appearance the entered text will have when it is displayed. Of course, when a bitmap file of each character constituting text entered by the user of the client computer 1 has been recorded on the hard disk of the client computer 1, the characters may be displayed in the preview area A17 using the designated fonts, as shown in FIG. 20, without displaying frames.

Character image display processing will be displayed next.

If the area A19 is clicked on by the user of the client computer 1, control shifts to character image display processing (step 56 in FIG. 18).

Reference is had to the bitmap font file that has been recorded on the hard disk of the client computer 1 (step 57). It is determined whether all of the character image data expressing characters having fonts, sizes and styles designated by the user and that constitutes text that has been entered by the user has been stored in the bitmap font file recorded on the hard disk (step 58).

If there is character image data that has not been stored in the bitmap font file, the layout information file that was generated by the character input processing of step 48 and a request for a bitmap text file are transmitted from the client computer 1 to the server 30 (step 59).

Upon receiving the layout information file and request for the bitmap text file from the client computer 1, the server 30 analyzes the layout information file that has been received (step 73 in FIG. 19). It is determined, in conformity with the results of analysis, whether a bitmap font file corresponding to the received layout information file has been recorded on the hard disk of the server 30 (step 75).

If a corresponding bitmap font file has not been recorded on the hard disk of the server 30, the corresponding bitmap file is generated based upon the received layout information (step 76). The generated bitmap font file is recorded on the hard disk of the server 30 (step 77).

A bitmap text file also is generated (step 78). If generation of the bitmap text file at the layout preview processing has been completed, then the processing of step 78 is skipped, as a matter of course.

Since a request for transmission of the bitmap text file has been issued in this case ("NO" at step 79), the bitmap text file is generated and then transmitted from the server 30 to the client computer 1 (step 80).

The bitmap text file transmitted from the server 30 is received by the client computer 1 (step 61). The bitmap text file that has been received is recorded anew on the hard disk of the client computer 1 (step 62). If all bitmap fonts are already on the hard disk of the client computer 1 ("YES" at step 58), then the client computer 1 generates the bitmap text file based upon the bitmap font file.

In any case, characters having fonts set by the user of the client computer 1 are displayed in the preview area A17 at the designated sizes and in the designated styles (step 63). The user of the client computer 1 views the character images and, if they are acceptable, clicks on the area A21 ("YES" at step 64). As a result, the character images displayed in the preview area are pasted in the selected text area (step 65).

Though a line boundary character check (Japanese hyphenation) has not be designated in the above-described processing, such processing may be designated if desired.

FIG. 21 shows the appearance of text in a case a line boundary character check (Japanese hyphenation) has not been designated. If this processing has not be designated, characters are displayed in accordance with the character order regardless of the types of symbols used. As a consequence, occasions arise in which a punctuation mark appears at the beginning of a line or a left parenthesis appears at the end of a line. Characters one does not wish to appear at the beginning of a line are stored in the list (located in the layout information file) of characters forbidden at the beginning of a line, and characters one does not wish to appear at the end of a line are stored in the list (located in the layout information file) of characters forbidden at the end of a line. In a case where a character contained in these lists appears at the beginning or end of a line, a line boundary character check, such as narrowing or widening the spacing between characters, is executed. A character in the list of characters forbidden at the beginning of a line is thus prevented from appearing at the beginning of a line, and a character in the list of characters forbidden at the end of a line is prevented from appearing at the end of a line.

FIGS. 22a, 22b and 22c illustrate examples of text entered in the text area.

In a case where the size of characters set by the user of the client computer 1 is too large, not all of the characters will fit in the text area, as shown in FIG. 22a. In this case data is communicated between the client computer 1 and server 30 and the characters are reduced in size until they fit within the text area.

However, this is disadvantageous in that sending and receiving data between the client computer 1 and server 30 a number of times results in higher communication costs. Accordingly, an arrangement may be adopted in which character images of a size commensurate with the text area are obtained by reducing or enlarging the character images represented by the display bitmap images of the bitmap text file stored on the hard disk of the client computer 1. The reduction or enlargement processing would be executed by the CPU 11 of the client computer 1.

Figure 23:
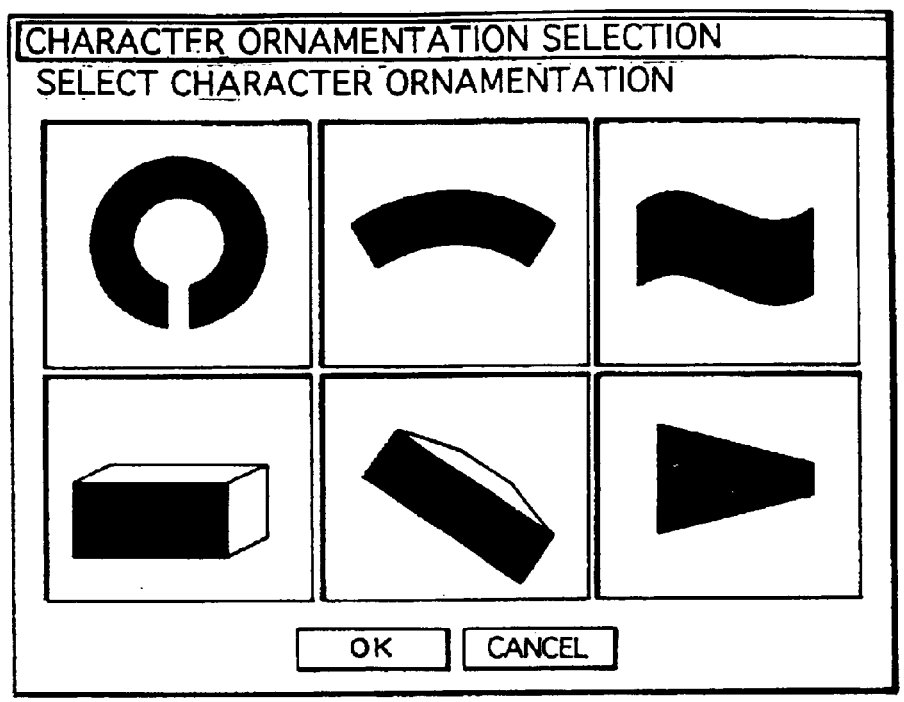
FIG. 23 illustrates a character ornamentation selection window.

Furthermore, rather than merely changing the style of each character constituting a character image, character ornamentation processing for changing the shape of the entire character image (character string) may be executed. In this case, a character ornamentation selection window of the kind shown in FIG. 23 is displayed on the display screen of the display device 19 of the client computer 1 when character image display processing is executed at the client computer 1. Here the user is allowed to select the desired character ornamentation. The data representing the selected character ornamentation is transmitted from the client computer 1 to the server 30.

Upon receiving the character ornamentation, the server 30 subjects the character image to character ornamentation processing based upon the data representing the character ornamentation that has been designated. Data representing the character image that has undergone character ornamentation processing is transmitted from the server 30 to the client computer 1. In this case also it goes without saying that data expressing a standard character image is transmitted from the server 30 to the client computer 1 and not just the character image that has been ornamented. Of course, the data expressing the standard character image need not necessarily be transmitted from the server 30 to the client computer 1

Figure 24:
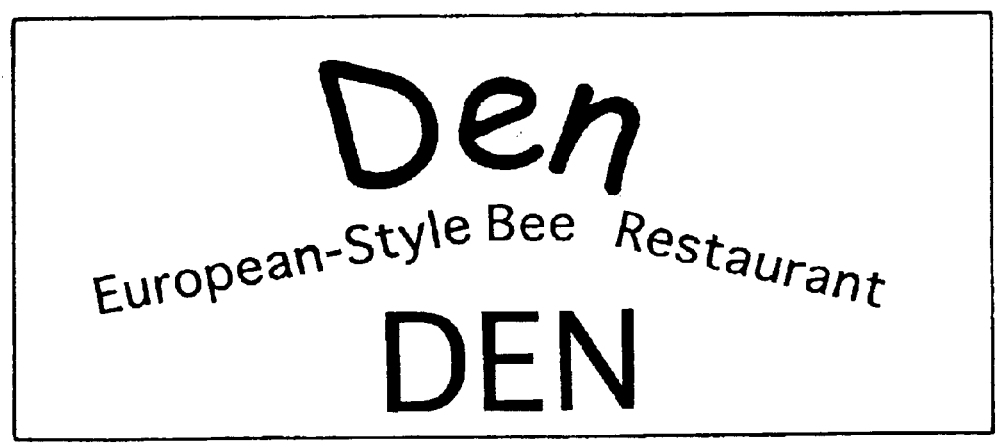
FIG. 24 shows an example of text displayed in a text area.

FIG. 24 illustrates an example of character strings whose characters have been ornamented.

As many apparently widely different embodiments of the present invention can be made without departing from the spirit and scope thereof, it is to be understood that the invention is not limited to the specific embodiments thereof except as defined in the appended claims.

What is claimed is:

1. A font sharing system in which data can be communicated between a client computer and a server, data representing a character string including a plurality of characters and data representing sizes of characters are included in the character string being transmitted to said server from said client computer, said server comprising:

layout generating means for generating data representing a layout based upon the data representing the character string and the data representing the sizes of characters transmitted from said client computer; and transmitting means for transmitting the layout data generated by said layout generating means, said client computer comprising:

display control means for controlling a display device so as to display only layout frames in a preview area on a display screen, each of the layout frames corresponding to the size of each character included in the character string based upon the layout data transmitted from said transmitting means of said server, wherein each of the layout frames are box-shaped such that each of the layout frames is able to enclose their respective characters that are represented by the data representing the sizes of characters.

2. The system according to claim 1, wherein said server retrieves, from a first character image data storage means, character image data expressing a character, which has been specified by the character string and has a size that has been designated by size designating data, as an image in such a manner that the specified character will have a font specified by font specifying data.

3. The system according to claim 2, wherein said client computer further includes:

second character image data storage means for storing character image data expressing a character as an image;

determination means for determining whether character image data expressing a character as an image has been stored in said second character image data storage means, wherein said character has been specified by the character string, has a font that has been specified by the font specifying data and a size that has been designated by the size designating data; and enlarging/reducing means which, in response to a determination by said determination means to the effect that the character image data has not been stored in said second character image data storage means, is for processing the character image data in such a manner that, of character image data that has been stored in said second character image data storage means, a character image that has been specified by the character specifying data and has a font that has been specified by the font specifying data will be enlarged or reduced so as to take on a size that has been designated by the size designating data.

4. The system according to claim 1, wherein said client computer further includes style data transmitting means for transmitting, to the server, character style designating data for designating style of a character specified by the character specifying data; and said server further includes:

designated character-style retrieval means for retrieving, from a first character image data storage means, designated-style character image data expressing, as an image, a character of a style designated by the character style designating data transmitted from said style data transmitting means;

designated-style character image data generating means for generating the designated-style character image data in response to a situation where the designated-style character image data is not found by said designated character-style retrieval means; and designated-style character image data transmitting means for transmitting, to said client computer, the designated-style character image data generated by said designated-style character image data generating means or the designated-style character image data found by said designated character-style retrieval means.

5. The system according to claim 4, wherein said server further includes style information transmitting means for transmitting, to said client computer, style information for generating the designated-style character image data; and said client computer further includes means for generating the designated-style character image data based upon the style information and the character image data transmitted from said style information transmitting means.

6. The system according to claim 1, wherein said server includes:

a printing device; and means for generating new character image data, from the character image data that has been designated by character image data generating means, so as to obtain a character image having a resolution suited to the resolution of said printing device.

7. A client computer capable of communicating data with a server, comprising:

input means for inputting a character string including a plurality of characters;

designating means for designating sizes of characters included in the character string inputted from said input means;

transmitting means for transmitting the character string data inputted from said input means and data representing the sizes of character designated by said designating means;

layout data receiving means for receiving layout data generated by said server based upon the data representing the character string and the data representing the sizes of characters transmitted from said transmitting means; and display control means for controlling a display device so as to display only layout frames in a preview area on a display screen, each of the layout frames corresponding to the size of each character included in the character string based upon the layout data received from said receiving means of said server, wherein each of the layout frames are box-shaped such that each of the layout frames is able to enclose their respective characters that are represented by the data representing the sizes of characters.

8. A server capable of communicating data with a client computer, comprising:

receiving means for receiving data representing a character string including a plurality of characters transmitted from said client computer and sizes of characters, which are included in the character string transmitted from said client computer;

layout generating means for generating data representing a layout based upon the data representing the character string and the data representing the sizes of characters; and transmitting means for transmitting the layout data generated by said layout generating means, wherein the layout data represents layout frames that are box-shaped such that each of the frames is able to enclose their respective characters that are represented by the data representing the sizes of characters, and wherein only the layout frames are displayed in a preview area on the client computer.

* * * * *